United States Patent [19]
Wright et al.

[11] 3,986,584
[45] Oct. 19, 1976

[54] FAIL-SAFE DISC BRAKE WITH SPRING ACTUATED SLACK ADJUSTER

[75] Inventors: Carl D. Wright, Forest Hills; Ronald W. Coiner, North Huntingdon; Allen W. Kyllonen, Plum Boro, all of Pa.

[73] Assignee: Westinghouse Air Brake Company, Wilmerding, Pa.

[22] Filed: Mar. 20, 1975

[21] Appl. No.: 560,314

[52] U.S. Cl................ 188/71.8; 74/107; 92/129; 92/130 A; 192/91 R; 192/111 A; 188/59; 188/72.7; 188/72.9; 188/83; 188/170; 188/196 V
[51] Int. Cl.[2]......................... F16D 65/52
[58] Field of Search............... 188/59, 71.8, 72.6, 188/72.7, 72.9, 170, 343, 196 V, 196 P, 79.5 GE, 83; 74/107; 192/111 A, 91 R; 92/20, 129, 130 A

[56] References Cited
UNITED STATES PATENTS

| 3,371,750 | 3/1968 | Schutte et al.............. | 188/71.8 |
| 3,425,519 | 2/1969 | Frigger...................... | 188/72.7 X |
| 3,633,715 | 1/1972 | Burnett...................... | 188/170 X |
| 3,701,398 | 10/1972 | Martins...................... | 188/196 P X |
| 3,752,266 | 8/1973 | Chouings.................... | 188/170 |
| 3,893,549 | 7/1975 | Bennett...................... | 188/170 |

FOREIGN PATENTS OR APPLICATIONS

| 1,561,274 | 2/1969 | France...................... | 188/72.6 |
| 2,201,082 | 1/1972 | Germany.................... | 188/72.7 |

Primary Examiner—George E. A. Halvosa
Attorney, Agent, or Firm—W. F. Poore; R. W. McIntire, Jr.

[57] ABSTRACT

This invention relates to a fluid pressure operated disc brake assembly that includes a tandem-arranged spring-applied fluid-pressure-related brake operating unit and an automatic slack adjuster mechanism which is actuated by a pair of springs to so compensate for wear of a disc brake rotor and/or brake shoes therefor that the brake shoes, while the brakes are released, are constantly lightly pressed against the brake rotor notwithstanding prior wear of the shoes and/or the rotor.

13 Claims, 3 Drawing Figures

3,986,584

FAIL-SAFE DISC BRAKE WITH SPRING ACTUATED SLACK ADJUSTER

BACKGROUND OF THE INVENTION

Certain heretofore known types of disc brake assemblies comprise a pair of pivoted brake-shoe-carrying levers or tongs that are actuated by movement of a wedge member between rollers mounted on the outer ends of the levers to thereby rock these levers until the brake shoes are forced into friction engagement with the opposite sides of a rotor. These heretofore known disc brake assemblies, such as that shown and described in U.S. Pat. No. 3,148,749, issued Sept. 15, 1964, to Eldon W. Bushnell, and assigned to Amsted Industries Incorporated, of Chicago, Illinois, have included a pawl and ratchet type of slack adjuster mechanism to compensate for wear of the brake shoes and/or the rotor. A pawl and ratchet type of slack adjuster mechanism is operative to take up slack, or compensate for wear, in steps or increments, the size of which corresponds to the arcuate distance between two adjacent teeth on a ratchet wheel. Therefore, it is apparent that until a chosen amount of wear has occurred, no compensation therefor is made. Under certain conditions, it is most desirable that wear compensation occur substantially simultaneously as the wear. Thus, in a spring-applied power released brake, the braking force applied to the braking member is reduced as wear occurs. Therefore, it is desirable that wear compensation occur while the brake application is in effect or upon the subsequent brake release.

Accordingly, it is the general purpose of this invention to provide a combined spring-applied fluid-pressure released and fluid power applied disc brake assembly with an automatically operative slack adjuster mechanism that includes spring-biased means that is effective, upon releasing each brake application, to compensate for the wear of the brake shoes and/or the rotor occurring while the brake application was in effect, this means also being effective, while the brakes are released, to constantly lightly press the brake shoes against the rotor thereby maintaining zero clearance therebetween.

SUMMARY OF THE INVENTION

According to the present invention, a disc brake assembly comprises a brake-shoe actuator having a cylinder in which is disposed, in coaxial bores extending inward from the respective opposite ends thereof and separated by an inturned flange, a pair of tandem-arranged pistons, one being spring-biased in the direction of the other and having a stem extending through the inturned flange for abutment with one side of the other whereby upon either the supply of fluid under pressure to this one side of this other piston or a release of fluid under pressure from the adjacent side of the one piston, a braking force is transmitted via the other piston or both pistons and a novel slack adjuster mechanism to a pair of pivoted levers or tongs, the rocking of which in opposite directions is effective to force the brake shoes against the respective opposite sides of a disc brake rotor to exert a braking force thereon. This novel slack adjuster mechanism is interposed between the other piston and a pair of rollers that are respectively rotatably mounted on corresponding ends of the pair of pivoted levers and comprises a pair of wedge-like elements one tapered side of each of which abuts one side of a wedge-shaped piston rod of the other piston, the other tapered side abutting one of a pair of tapered inner surfaces formed on the interior of a hollow actuator member that is slidably mounted on one end of the cylinder and is provided on its exterior with a pair of inclined surfaces along which the pair of rollers roll upon movement of the actuator member relative to the cylinder to enable rocking of the pivoted levers in opposite directions in response to this movement, and a pair of springs, each interposed between the other piston and one of the pair of wedge-like elements and effective to move the corresponding wedge-like element along the wedge-like piston rod in the direction away from the other piston, upon the release of a brake applying force therefrom subsequent to wear of the brake shoes and/or the rotor, to shift the hollow actuator member relative to the cylinder, this shifting of the actuator member being effective via the pivoted levers to cause the brake shoes, while the brakes are released, to be constantly lightly pressed against the rotor notwithstanding prior wear of the brake shoes and/or the rotor.

DESCRIPTION

Figure 1:
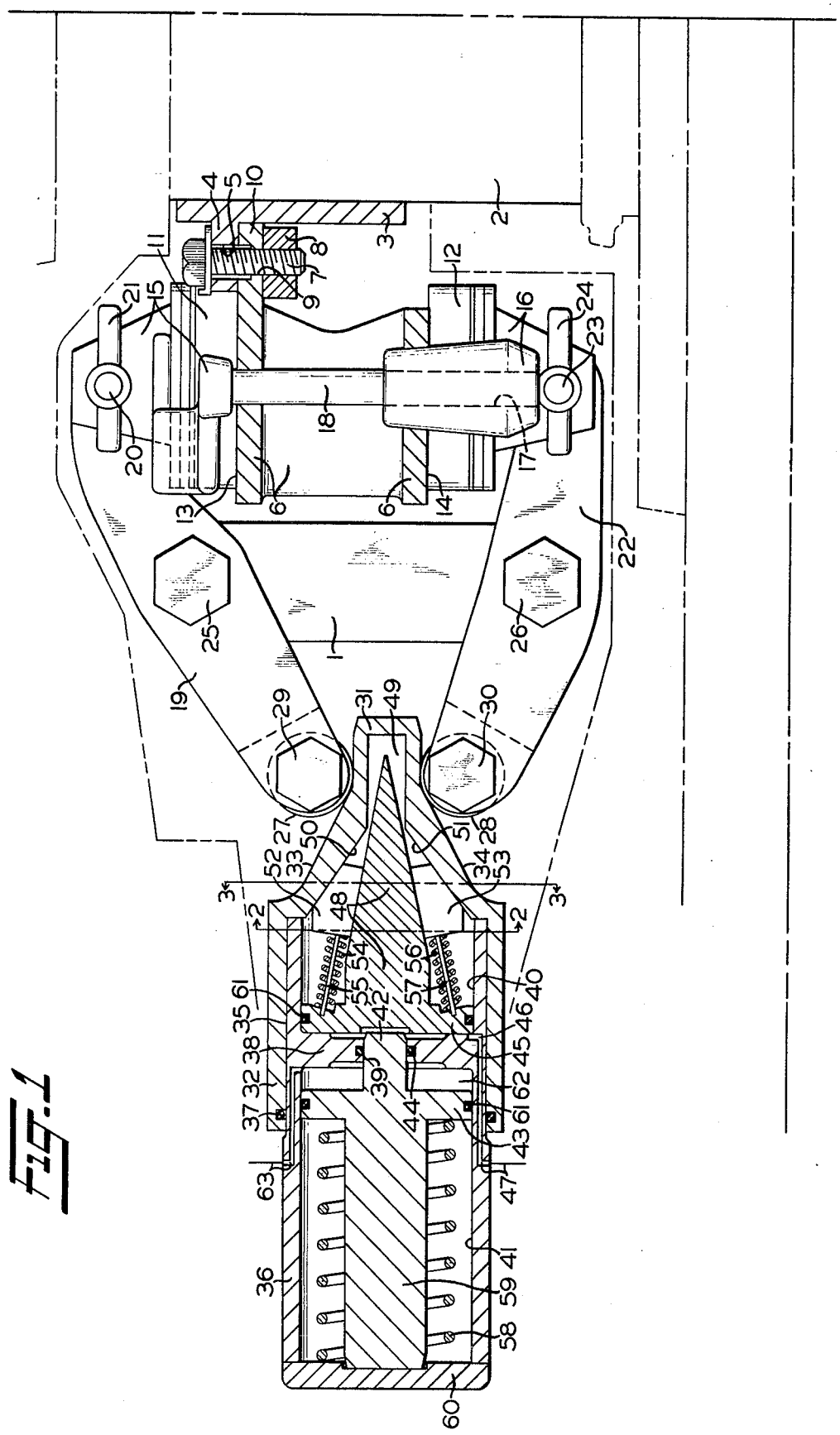
FIG. 1 is a plan view, partly in section, of a fluid-pressure-operated disc brake assembly that has associated therewith a tandem-arranged spring-applied fluid-pressure-released brake operating unit and an automatic slack adjuster mechanism.

Referring to FIG. 1 of the drawings, there is shown a disc brake assembly for one axle of a two-axle four-wheel railway vehicle truck in which a supporting bracket 1 is secured to a transom (not shown) of the truck. Only one of the two axles of this truck is shown in FIG. 1 and is indicated by the reference numeral 2. Press-fitted on this axle 2 is a sleeve 3 that has formed integral therewith an outturned flange 4. This flange 4 is provided with a plurality of arcuately spaced bores 5 only one of which appears in FIG. 1. A disc member or rotor 6 is secured to the flange 4 by a plurality of bolts 7 and nuts 8, each bolt 7 extending through one of the bores 5 in the outturned flange 4 and a corresponding one of a plurality of coaxial bores 9 provided in an inturned flange 10 that is integral with the rotor 6.

A pair of brake shoe assemblies 11 and 12, which are generally C-shaped in form and provided with a suitable brake lining, are disposed in position for contact with the respective opposed braking faces 13 and 14 on the rotor 6.

The brake shoe assemblies 11 and 12 are respectively carried by a pair of brake head assemblies 15 and 16. Formed integral with one side of the brake head assembly 15 and extending with a sliding fit through a bore 17 provided therefor in the brake head assembly 16 is a guide rod 18 that serves to maintain the brake shoe assemblies 11 and 12 substantially parallel to the braking faces 13 and 14 on the rotor 6.

The brake head assembly 15 is pivotally mounted adjacent one end of a first lever or tong 19 by means of a pin 20 that extends through suitable coaxial bores provided therefor in this brake head assembly 15 and lever 19 and a key 21 that extends through a slot in this pin 20 adjacent one end thereof.

Likewise, the brake head assembly 16 is pivotally mounted on one end of a second lever or tong 22 by means of a pin 23 and a key 24.

The lever 19 is pivotally mounted intermediate its ends on the hereinbefore-mentioned supporting bracket 1 adjacent one end thereof by means of such as, for example, a headed pin 25, and the lever 22 is pivotally mounted intermediate its ends on this bracket 1 adjacent the opposite end by means such as, for example, a headed pin 26.

The other end of the levers 19 and 22 is bifurcated to enable pivotally mounting thereon one of a pair of rollers 27 and 28 by means such as, for example, one of a pair of headed pins 29 and 30.

Figure 3:
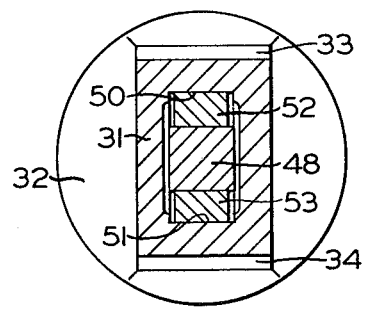
FIG. 3 is a vertical cross-sectional view, taken along the line 3—3 of FIG. 1 and looking in the direction of the arrows, showing further structural details of the slack adjuster mechanism.

As shown in FIGS. 1 and 3, a hollow wedge-like element 31, rectangular in cross-section, is formed integral with and extends outward from the right-hand end of a hollow cylindrical actuator member 32 and is provided on its exterior with a pair of divergent track surfaces 33 and 34 along which the respective rollers 27 and 28 may roll when the wedge-like element 31 and actuator member 32 are moved in the direction of the right hand by means hereinafter described in detail.

The hollow cylindrical actuator member 32 is slidably mounted on an outer cylindrical surface 35 provided therefor on the right-hand end, as viewed in FIG. 1, of a brake housing member 36 that is secured by any suitable means (not shown) to some convenient member of the vehicle truck. In order to provide a fluid pressure seal between the interior wall surface of the hollow cylindrical actuator member 32 and the outer cylindrical surface 35, this interior wall surface is provided with an annular groove in which is carried an O-ring seal 37 that is disposed about the cylindrical surface 35 in sealing relationship therewith.

Intermediate the ends thereof, the housing member 36 is provided with a wall 38 through which extends a bore 39 that at its right-hand end opens into a coaxial counterbore 40 and at its left-hand end opens into a coaxial counterbore 41. In order to provide a fluid pressure seal between the wall surface of the bore 39 and a stem 42 formed integral with one side of a piston 43 that is slidably mounted in the counterbore 41, the wall surface of this bore 39 is provided with an annular groove in which is disposed an O-ring seal 44 that encircles this stem 42 in sealing relationship therewith.

Slidably mounted in the counterbore 40 is a fluid pressure operated brake-applying piston 45, the left-hand side of which cooperates with the wall 38 to form a chamber 46 to which either an incompressible hydraulic fluid, such as a suitable oil, or a compressible fluid such as a suitable gas, as, for example, air under pressure, may be supplied, under the control of the operator of the vehicle, from a suitable source (not shown) via a pipe 47 and a correspondingly numbered passageway that extends through the housing member 36 and opens into this chamber 46.

Formed integral with the piston 45 and extending from the right-hand side thereof is a wedge-shaped element 48, the outer end of which extends into a cavity 49 rectangular in cross-section and formed in the wedge-like element 31.

Figure 2:
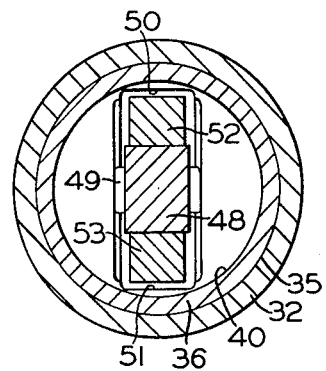
FIG. 2 is a vertical cross-sectional view, taken along the line 2—2 of FIG. 1 and looking in the direction of the arrows, showing certain details of the slack adjuster mechanism not made apparent in FIG. 1.

As shown in FIGS. 1, 2, and 3 of the drawings, the hollow rectangular wedge-like element 31 has formed on the interior thereof a pair of divergent flat surfaces 50 and 51 one end of each of which, as shown in FIG. 1, terminates at the lefthand end of the rectangular cavity 49 and the other end of which terminates adjacent the right-hand end of the counterbore 40 in the housing member 36.

Disposed between the upper tapered flat surface of the wedge-shaped piston rod 48 and the flat surface 50 is a first slack-take-up element 52, and disposed between the lower tapered flat surface of this wedge-shaped piston rod 48 and the flat surface 51 is a second slack-take-up element 53 that is identical to the element 52.

Interposed between the right-hand side of the piston 45 and the left-hand end of the first slack-take-up element 52 is a first precompressed spring 54 that surrounds a first rod 55 that has its left-hand end anchored, as by a press fit, in the piston 45 and its right-hand end abutting the left-hand end of the slack-take-up element 52 while this element occupies the position shown in FIG. 1.

Likewise, interposed between the right-hand side of the piston 45 and the left-hand end of the second slack-take-up element 53 is a second precompressed spring 56 that surrounds a second rod 57 that has its left-hand end anchored, as by a press fit, in the piston 45. These rods 55 and 57 serve to prevent movement of the slack-take-up elements 52 and 53 in the direction of the piston 45 from the position in which they are shown in FIG. 1, whereas the springs 54 and 56 effect movement of these elements 52 and 53 in the direction of the right hand along the wedge-shaped piston rod 48 when wear of the brake lining of the brake shoe assemblies 11 and 12 and/or the rotor 6 occurs to always maintain zero clearance or constant contact between these brake linings and the braking faces 13 and 14 on the rotor 6.

In order to provide a spring-appiied fluid-pressure-released parking or emergency brake, a heavy spring 58 is disposed about a stem 59 extending from the left-hand face of the hereinbefore-mentioned piston 43 and interposed between this piston 43 and an end cover 60 that is secured to the left-hand end of the housing member 36 by any suitable means (not shown).

The pistons 43 and 45 are each provided with a peripheral annular groove in which is disposed an O-ring seal 61 to prevent leakage of fluid under pressure from one side of the respective piston to the other side.

The right-hand side of the piston 43 cooperates with the wall 38 to form a chamber 62 to which either a liquid or gas under pressure may be supplied from a suitable source (not shown) via a pipe 63 and correspondingly numbered passageway that extends through the housing member 36 and opens into this chamber 62. So long as the chamber 62 is charged with a fluid at a pressure sufficient to overcome the force of the spring 58, the piston 43 will be maintained in the position shown in FIG. 1 in which position the left-hand end of the stem 59 abuts the end cover 60 and the right-hand end of the stem 43 is spaced a short distance away from the piston 45 to enable the springs 54 and 56, in the absence of fluid under pressure in the chamber 46, to bias this piston 45 against the left-hand end of the counterbore 40 which acts as a stop for this piston.

OPERATION

Normally, fluid under pressure is supplied to the chamber 62 via the pipe and passageway 63 to maintain the piston 43 in the position in which it is shown in which position the spring 58 is compressed and the stem 59 abuts the end cover 60, as shown in FIG. 1.

Furthermore, the chamber 46 is normally void of fluid under pressure thereby enabling the springs 54 and 56 to maintain the piston 45 in the position shown in FIG. 1 in which it abuts the left-hand end of the counterbore 40.

Moreover, the springs 54 and 56 are effective to transmit a force to the wedge-like element 31 and actuator member 32 via the slack-take-up elements 52 and 53, it being apparent from FIG. 1 that this force acts in the direction of the right hand on the element 31 and member 32. Accordingly, this force acting on the wedge-like element 31 and actuator member 32 is transmitted to the levers or tongs 19 and 22 via the track surfaces 33 and 34 on wedge-like element 31 and the rollers 27 and 28. Therefore, the force thus transmitted to the lever 19 acts in the direction to rock this lever clockwise about the pin 25 to cause the brake lining of the brake shoe assembly 11 to be pressed against the braking face 13 of the rotor 6. Likewise, the force transmitted to the lever 22 causes the brake lining of the brake shoe assembly 12 to be pressed against the braking face 14 of rotor 6. Consequently, a light braking force is constantly exerted on the rotor 6, the degree of this braking being in accordance with the strength of the springs 54 and 56.

When it is desired to apply a fluid pressure braking force to the rotor 6 in excess of the light braking force exerted on this rotor by the springs 54 and 56, fluid under pressure is admitted via pipe and passageway 47 to the chamber 46 (FIG. 1) by operation of the brake control valve device of the usual air brake apparatus on railway vehicles under the control of the operator. Fluid under pressure thus supplied to the chamber 46 is effective to exert a fluid pressure force on the piston 45. This force exerted on the piston 45 is transmitted via the piston rod 48 and slack-take-up elements 52 and 53 to the hollow cylindrical element 32 and wedge-like element 31, it being apparent that this force acts in the direction of the right hand, as viewed in FIG. 1. This force acting in the direction of the right hand on the element 31 and member 32 is transmitted via the track surfaces 33 and 34 on the exterior of the element 31 to the rollers 27 and 28 which in turn would rock the levers 19 and 22 in opposite directions about the respective pins 25 and 26 were the brake linings of the brake shoe assemblies 11 and 12 not already in contact with the braking faces 13 and 14 of the rotor 6. Consequently, the force exerted on the rollers 27 and 28 is transmitted via the levers 19 and 22 to the brake linings of the respective brake shoe assemblies 11 and 12 which linings are thereby pressed against the corresponding braking faces 13 and 14 of the rotor 6 thus increasing the braking force on this rotor 6, it being apparent that the braking force thus exerted on the rotor 6 varies in accordance with the degree of pressure of the fluid present in the chamber 46.

When it is desired to release the brake application on the rotor 6, the fluid under pressure previously supplied to the chamber 46 is vented in the usual manner through operation of the brake control valve device of the vehicle brake apparatus under the control of the operator whereupon the braking force transmitted to the rotor 6 is reduced to a small value corresponding to the strength of the springs 54 and 56.

Now let it be supposed that while the brakes are applied, the brake linings of the brake shoe assemblies 11 and 12 and/or the braking faces 13 and 14 of the rotor 6 begin to wear away.

It is apparent from FIG. 1 that as these brake linings and/or the braking faces 13 and 14 of the rotor 6 wear away, the levers 19 and 22 must be rocked respectively clockwise and counterclockwise in order to maintain these brake linings in braking contact with the braking faces 13 and 14 of the rotor 6.

As these brake linings and/or the braking faces 13 and 14 of the rotor 6 wear away, the fluid under pressure acting on the left-hand face of the piston 45 transmits a force to the levers 19 and 22 via the piston rod 48, slack-take-up elements 52 and 53, wedge-like element 31 having track surfaces 33 and 34 on the exterior thereof and rollers 27 and 28 which acts in the direction to rock these levers respectively clockwise and counterclockwise so that the brake lining of the brake shoe assembly 11 is pressed against the braking surface 13 of the rotor 6 and the brake lining of the brake shoe assembly 12 is simultaneously pressed against the braking surface 14 of this rotor 6. Thus, the levers 19 and 22 are rocked in opposite directions through a small angle corresponding to the amount of wear of the brake linings and/or the rotor 6 occurring while a brake application is in effect.

When it is desired to release the brake application, subsequent to the wearing away of the brake linings and/or the rotor 6, and the rocking in opposite directions of the levers 19 and 22 in the manner described above to maintain the brake lining in contact with the braking surfaces 13 and 14 on the rotor 6, the fluid under pressure previously supplied to the chamber 46 is vented in the usual manner through the passageway and pipe 47 to the brake control valve device and thence to atmosphere.

Upon thus venting fluid under pressure from the chamber 46, the precompressed springs 54 and 56 expand. This expansion of these springs 54 and 56 is effective to (1) return the piston 45 to the position shown in FIG. 1, and (2) move the slack-take-up elements 52 and 53 in the direction of the right hand, as viewed in FIG. 1, along the respective upper and lower tapered flat surfaces on the wedge-shaped piston rod 48.

Since the slack-take-up element 52 abuts the flat surface 50 on the interior of the wedge-like element 31, and the slack-take-up element 53 abuts the flat surface 51 on the interior of this element 31, it is apparent that as these elements 52 and 53 are moved by the respective springs 54 and 56 in the direction of the right hand along the wedge-shaped piston rod 48, this element 31 and the hollow cylindrical actuator member 32 that is integral therewith will be shifted in the direction of the right hand relative to and along the outer cylindrical surface 35 on the housing member 36.

As the wedge-like element 31 and actuator member 32 are thus shifted in the direction of the right hand, as viewed in FIG. 1, it can be readily seen that the rollers 27 and 28 are caused to respectively roll along the track surfaces 33 and 34 formed on the element 31.

Accordingly, it is apparent that as the roller 27 rolls along the track surface 33, the lever 19 is rocked clockwise so that the brake lining of the brake shoe assembly 11 is maintained in contact with the braking face 13 on the rotor 6.

Likewise, as the roller 28 rolls along the track surface 34, the lever 22 is rocked counterclockwise so that the brake lining of the brake shoe assembly 12 is maintained in contact with the braking face 14 of rotor 6.

From the foregoing, it is apparent that as the brake linings of the brake assemblies 11 and 12 and/or the braking faces 13 and 14 of the rotor 6 wear away while a brake application is in effect, the levers 19 and 22 are respectively rocked clockwise and counterclockwise to maintain these brake linings in braking contact with the braking faces 13 and 14 on the rotor 6. Thereafter, upon effecting a brake release, the springs 54 and 56 are effective to (1) return the piston 45 to its release position shown in FIG. 1 and (2) also, via slack-take-up elements 52 and 53, wedge-like element 31 having track surfaces 33 and 34 thereon, and rollers 27 and 28, rock the levers 19 and 22 respectively clockwise and counterclockwise so that the brake linings of the brake shoe assemblies 11 and 12 are maintained in light braking contact with the corresponding braking faces 13 and 14 on the rotor 6.

Let it now be supposed that while the chamber 46 is void of fluid under pressure and the chamber 62 is supplied with fluid under pressure via the pipe and passageway 63 to maintain the piston 43 in the position shown in which stem 59 abuts the end cover 60, this pipe 63 is broken or ruptured or the fluid under pressure present in the chamber 62 is otherwise vented to atmosphere as, for example, by means of a valve device connected to the pipe 63 and operated to a venting position by an operator to cause an emergency or a parking brake application on the vehicle.

Whenever fluid under pressure is released from the chamber 62 to atmosphere, the heavy spring 58 is allowed to expand and shift the piston 43 in the direction of the right hand, as viewed in FIG. 1.

As the spring 58 thus shifts the piston 43 from the position in which it is shown in FIG. 1, the stem 42 that is integral with this piston 43 is moved into abutting relationship with the left-hand face of the piston 45. Thereafter, the spring 58 shifts pistons 43 and 45 simultaneously in the direction of the right hand, as viewed in FIG. 1. This shifting of the piston 45 in the direction of the right hand effects a brake application on the rotor 6 in the same manner as hereinbefore described in connection with the supply of fluid under pressure to the chamber 46 at the left-hand side of the piston 45.

The brake linings of the brake shoe assemblies 11 and 12 will remain pressed against the braking faces 13 and 14 of the rotor 6 by the spring 58 until fluid under pressure is again supplied to the chamber 62 to move the piston 43 in the direction of the left hand against the yielding resistance of the spring 58 to the position shown in FIG. 1 in which the left-hand end of the stem 59 abuts the end cover 60.

It may be noted that if wear of the brake linings and/or the rotor 6 occurs while the spring applied brake application is in effect, these brake linings will be maintained in braking contact with the brain surfaces 13 and 14 of the rotor 6 by the force of the spring 58 notwithstanding this wear.

Moreover, when fluid under pressure is again supplied to the chamber 62 to return the piston 43 to the position shown in FIG. 1, the springs 54 and 56 will be rendered effective to return the piston 45 to the position shown in FIG. 1 and also maintain the brake linings of the brake shoe assemblies 11 and 12 against the respective braking surfaces 13 and 14 of the rotor 6, thus compensating for the wear that occurred while the spring-applied brake application was in effect. Therefore, the novel spring-biased slack adjuster mechanism embodied in the present invention operates the same for a spring-applied brake application as for a fluid pressure applied application.

Having now described the invention what we claim as new and desire to secure by Letters Patent is:

1. In a brake assembly for one axle of a vehicle truck wherein the opposite sides of a rotor secured to said axle are braked by a pair of braking elements operatively connected to the respective one end of a pair of levers each pivotally mounted intermediate its ends on a member carried by said truck;
   a. cam means disposed between the other ends of said pair of levers and movable in one direction relative thereto to cause rocking thereof in opposite directions to force said pair of braking elements into braking contact with the opposite sides of said rotor,
   b. fluid pressure operated motor means for moving said cam means in said one direction, said motor means comprising;
      i. a member having a cylindrical surface on its exterior and a coaxial bore therein, and
      ii. a piston slidably mounted in said bore and provided with a wedge-shaped element extending from one side thereof, and, wherein the improvement comprises;
   c. a slack adjuster mechanism operable to compensate for wear of said braking elements and/or rotor, said mechanism including,
      i. a hollow cylindrical element formed integral with said cam means and slidably mounted on said cylindrical surface, said hollow cylindrical element being provided with a plurality of inclined plane surfaces on the interior thereof,
      ii. a plurality of slack-take-up elements each interposed between one of said plurality of inclined plane surfaces on the interior of said hollow cylindrical element and said wedge-shaped element and shiftable relative to each, and
      iii. biasing means interposed between said slack-take-up elements and said piston and effective to shift said slack-take-up elements relative to both said inclined plane surfaces and said wedge-shaped element in response to said motor means terminating the transmittal of a brake applying force to said rotor subsequent to wear occurring while said brake applying force is effective on said rotor, said shifting of said slack-take-up elements being also effective to cause shifting of said hollow cylindrical element relative to said cylindrical surface of said member simultaneously as said slack-take-up elements shift.

2. In a brake assembly for one axle of a vehicle truck, as recited in claim 1, further characterized in that said biasing means comprises a plurality of precompressed springs, each interposed between said piston of said motor means and one of said plurality of slack-take-up elements.

3. In a brake assembly for one axle of a vehicle truck, as recited in claim 1, further characterized in that each of said plurality of slack-take-up elements comprises a wedge, the taper of one side thereof being such as to enable said one side to abut a corresponding inclined plane surface on said hollow cylindrical element and the taper of the other side being such as to enable said other side to abut one side of said wedge-shaped element extending from one side of said piston.

4. A slack adjuster mechanism for a disc brake assembly having motor means and a pair of pivoted braking-element-carrying levers through which a brake-applying force is transmitted to a rotor of the disc brake assembly, said mechanism comprising;
   a. a hollow cylindrical element slidably mounted on said motor means and provided with a plurality of exterior and interior cam surfaces, said exterior cam surfaces being so disposed as to effect rocking of said levers upon shifting of said element relative to said motor means,
   b. a plurality of slack-take-up elements interposed between said interior cam surfaces and said motor means and shiftable relative to each, and
   c. biasing means interposed between said slack-take-up elements and said motor means and effective to shift said slack take-up-elements relative to both said interior cam surface and said motor means in response to said motor means terminating the transmittal of a brake applying force to said rotor subsequent to wear occurring while said brake applying force is effective on said rotor, said shifting of said slack-take-up elements being also effective to cause shifting of said hollow cylindrical element relative to said motor means simultaneously as said slack-take-up elements shift.

5. A slack adjuster mechanism, as recited in claim 4, further characterized in that each of said plurality of slack-take-up elements comprises a wedge, the taper of one side of which differs from the taper of the other side.

6. A slack adjuster mechanism, as recited in claim 4, further characterized in that said biasing means comprises a plurality of precompressed springs, and by means for limiting the precompression of each of said springs.

7. A slack adjuster mechanism, as recited in claim 6, further characterized in that said means for limiting the precompression of each of said springs comprises a rod anchored at one end in said motor means, extending through said spring and coaxial with the corresponding one of said slack-take-up elements.

8. A slack adjuster mechanism, as recited in claim 6, further characterized in that said rods in cooperation with said slack-take-up elements transmit the brake applying force from said motor means to said pair of pivoted braking-element-carrying levers.

9. A slack adjuster mechanism, as claimed in claim 4, further characterized in that said slack-take-up elements are rectangular in cross section.

10. In a brake assembly for one axle of a vehicle truck wherein the opposite sides of a rotor secured to said axle are braked by a pair of braking elements operatively connected to the respective one end of a pair of levers each pivotally mounted intermediate its ends on a member carried by said truck, wherein the improvement comprises; a combined fluid pressure and spring actuated brake applying means for effecting rocking of said pair of levers in opposite directions to force said pair of braking elements into braking contact with the opposite sides of said rotor, said brake applying means comprising;
   a. cam means disposed between the outer ends of said pair of levers and movable in one direction relative thereto to cause rocking thereof in said opposite directions,
   b. a pair of tandem-arranged motors, one of which is operated independently of the other in response to the supply of fluid under pressure thereto to move said cam means in said one direction, and said other of which is operated in response to the release of fluid under pressure therefrom to transmit a force via said one motor to said cam means whereby said cam means is moved in said one direction to cause rocking of said levers in the absence of the supply of fluid under pressure to said one motor, and
   c. resilient means interposed between said pair of tandem-arranged motors and said cam means whereby said pair of braking elements are constantly lightly biased against the opposite sides of said rotor in the absence of fluid under pressure in said one motor and the presence of fluid under pressure in said other motor notwithstanding wear of said braking elements.

11. In a brake assembly for one axle of a vehicle truck, as recited in claim 10, further characterized in that said cam means comprises;
   a. a wedge-like element having formed on its exterior a pair of divergent track surfaces that abut the respective other ends of said pair of levers and movable in said one direction to rock said levers in said opposite directions, and
   b. a pair of rollers respectively pivotally mounted on said other end of said levers and rollable along said pair of track surfaces upon movement of said wedge-like element in said one direction, and said resilient means is interposed between said pair of tandem-arranged motors and said wedge-like element whereby said resilient means is constantly effective to transmit a chosen degree of force to each of said braking elements via said wedge-like element, said rollers and said pair of levers so that each of said elements is always biased against the corresponding side of said rotor with substantially the same degree of force notwithstanding wear of the respective element.

12. In a brake assembly for one axle of a vehicle truck, as recited in claim 10, further characterized in that said pair of tandem-arranged motors comprises;
   a. a casing provided with a bore and two coaxial counterbores extending inward from the respective opposite ends thereof,
   b. a first piston slidably mounted in one of said counterbores and movable in one direction therein upon the supply of fluid under pressure to one side thereof,
   c. means carried by said first piston whereby movement of said first piston in said one direction is transmitted via said cam means to said pair of levers to cause the rocking thereof in said opposite directions,
   d. a second piston slidably mounted in the other of said counterbores, said second piston having extending from each of its respective opposite sides a stem, one of which stems extends through said bore in said casing and the other of which limits movement of said second piston in the direction away from said first piston upon the supply of fluid under pressure to one side of said second piston, and
   e. means operative in response to the release of fluid under pressure from said one side of said second piston to transmit a force to said first piston via said second piston and said one stem integral therewith to effect simultaneous movement of both of said pistons in said one direction, and in that said resilient means is interposed between said one piston and said cam means whereby said resilient means is effective, in response to the release of fluid under pressure from said one piston subsequent to wear of said braking elements, to shift said cam means relative to said one piston an amount corresponding to the degree of said wear of said braking elements.

13. In a brake assembly for one axle of a vehicle truck, as recited in claim 12, further characterized in that said means carried by said one piston is effective to limit movement of said cam means in the direction of said one piston.

* * * * *